UNITED STATES PATENT OFFICE.

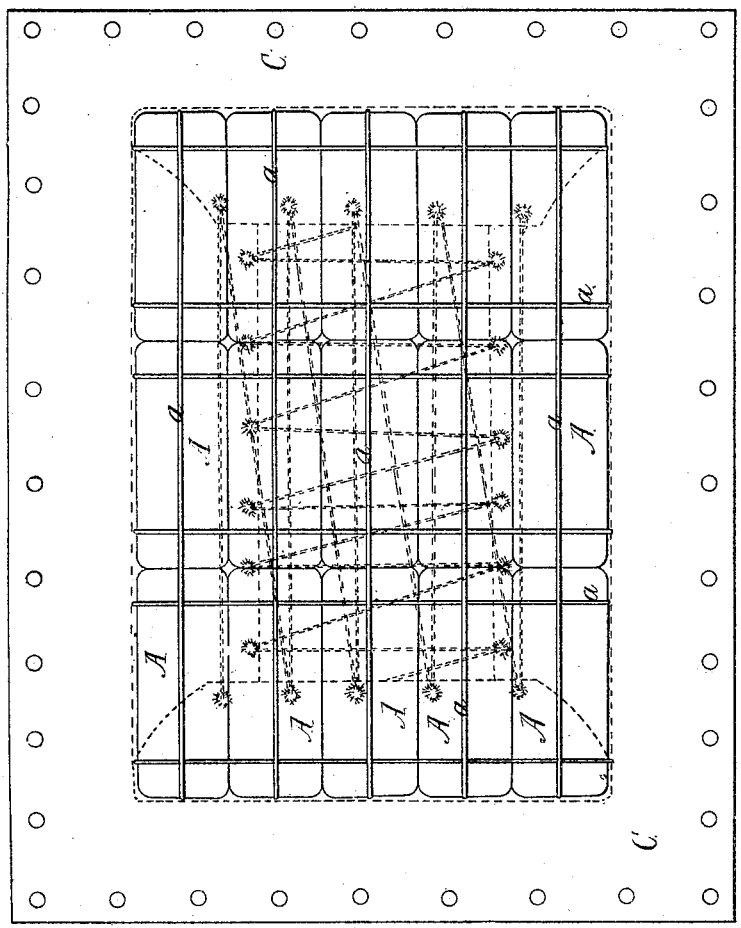
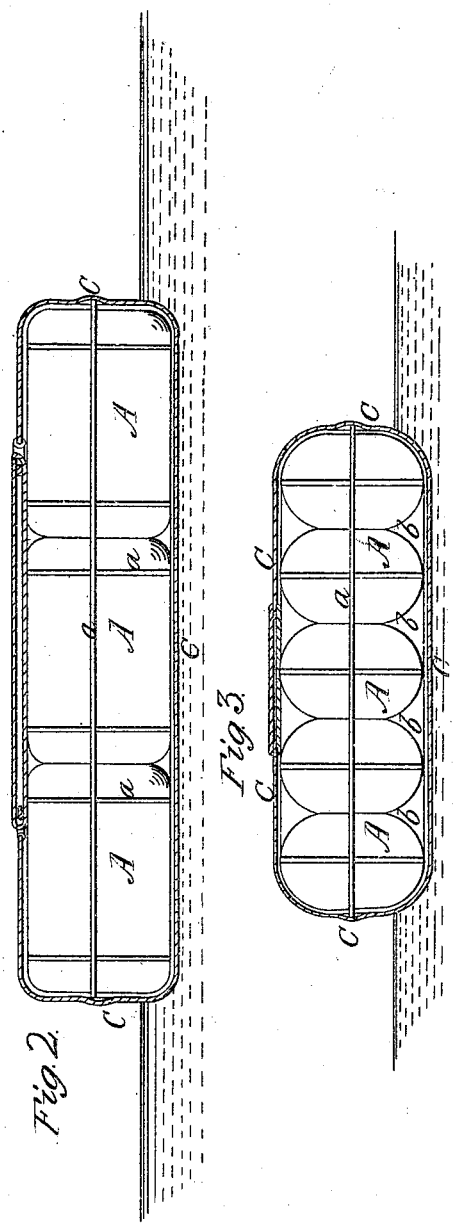

THOMAS BYRNE, OF NEW YORK, N. Y.

IMPROVED COTTON-BALE RAFT.

Specification forming part of Letters Patent No. 51,140, dated November 28, 1865.

*To all whom it may concern:*

Be it known that I, THOMAS BYRNE, of the city of New York, county and State of New York, have invented a new Mode of Transporting Cotton-Bales; and I do hereby declare that the following is a full, clear, and exact description thereof, reference being had to the accompanying drawings, making a part of this specification, in which—

Figure 1 is a top view of a number of cotton-bales bound together for receiving a waterproof envelope. Fig. 2 is a vertical sectional view of the raft of cotton-bales. Fig. 3 is a cross-section through the raft, showing the air-spaces between the bales when they are properly bound together and enveloped.

Similar letters of reference indicate corresponding parts in the several figures.

This invention relates to a novel mode of transporting cotton-bales and other merchandise upon rivers which are not navigable for large steamers or flat-boats, for the purpose of avoiding the labor and expense of transporting such merchandise upon land.

The nature of my invention consists in forming rafts of such merchandise which shall be perfectly water-proof and capable of being navigated upon shallow streams by means of oars or poles, or towed by steam or other power, as will be hereinafter described.

To enable others skilled in the art to understand my invention, I will describe its construction and operation.

There are many rivers in cotton-growing districts which are not navigable for three or four months of the year by steamboats or flat-boats, owing to the sand-bars on such rivers, and for this reason the cotton-growers are compelled to send their cotton overland to a point where they can have it transported by water to market.

To overcome this difficulty I take a number of cotton-bales—say ten or fifteen—and firmly bind them all together, in the manner shown in the drawings, by means of chains, wires, or ropes. The bales A A are placed side by side upon a flat surface, and the ropes or chains $a$ $a$ drawn under them and brought together, so as to form a compact raft of cotton. An india-rubber cloth or other water-proof material is now placed under the raft and its edges brought over the bales and secured by lacing, as shown in the drawings, so as to form an envelope or outer skin for protecting the cotton from water.

It may be found most convenient to spread the cloth C upon a flat surface previously to constructing the raft, and thus prevent the necessity of lifting the raft in order to apply said cloth to it. Such a flat surface may be formed by making an inclined plane of planks on the bank of a river which it is desired to navigate; or a kind of launching-wharf may be constructed, so that the raft can be readily launched from it into the center or deepest part of the stream. If an inclined wharf is soaped or greased, the raft can be easily slid from it when ready for launching.

The average weight of cotton-bales is five hundred pounds. The average size is five by three by two, making thirty cubic feet, and as each cubic foot of water weighs over sixty pounds, a bale of cotton could float thirteen hundred pounds weight on top of it without being submerged entirely. In other words, a bale of cotton could float on about ten inches of water on that side which is five by two, and on seven inches of water on that side which is five by three, and when the bales are made up into a raft and the bottom and sides covered, so as to keep out water, as above described, such raft can be floated over bars over which an unloaded flat-boat would not float.

Owing to the elastic properties of baled cotton, the sides of the bales will assume a rounded form, and consequently water-tight apartments $b$ $b$ will be left by the water-tight envelope, as shown in Fig. 3, which will necessarily augment the floating capacity of the raft.

About ten bales of cotton will be sufficient for one raft, and several of such rafts may be secured together, where the rivers will admit of it, and navigated as one raft. I do not limit myself to any definite number of bales to constitute a raft, for in some cases a raft may be constructed of a board flooring covered on the outside with a water-proof cloth, and the bales or other articles of merchandise secured together upon such floor. The floor will add stiffness to the raft and admit of a large number of bales being employed in the formation thereof. In all cases I shall employ a water-proof envelope to prevent the cotton or other article from becoming wet.

Having thus described my invention, what I claim as new, and desire to secure by Letters Patent, is—

The mode, substantially as herein described, of rafting cotton-bales and other baled or bundled merchandise of a buoyant character upon rivers, the said mode comprising a frame or platform for a series of bales or bundles, and a water-proof covering applied under the bottom, around the sides and ends, and partly or wholly over the top of the raft of bales or bundles, as described and represented.

THOS. BYRNE.

Witnesses:
SAM. L. HARRIS,
WM. H. HACKER.